Sept. 15, 1953  L. T. DI LANGIANO  2,652,476
ELECTRICALLY HEATED STEERING WHEEL
Filed March 18, 1952
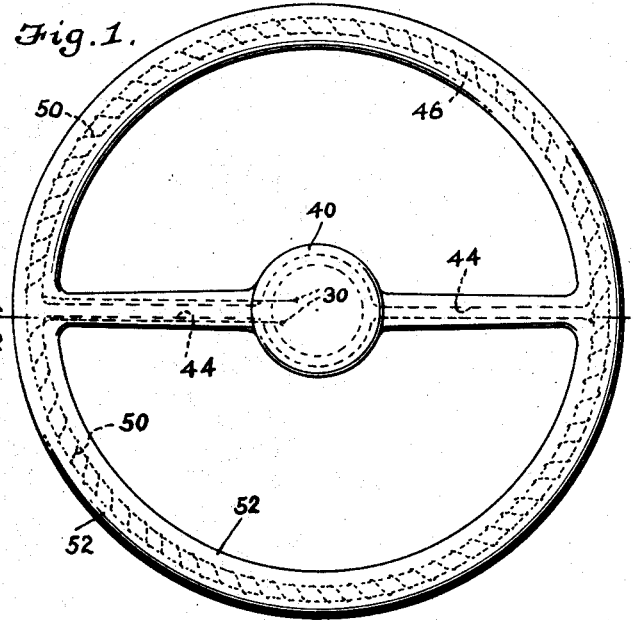
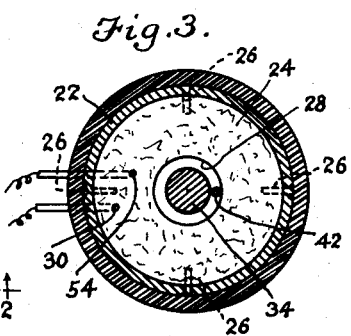
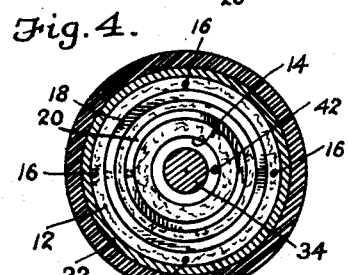
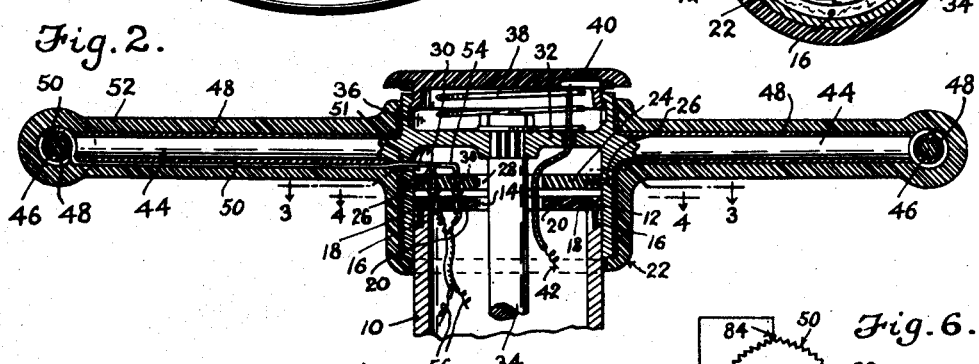
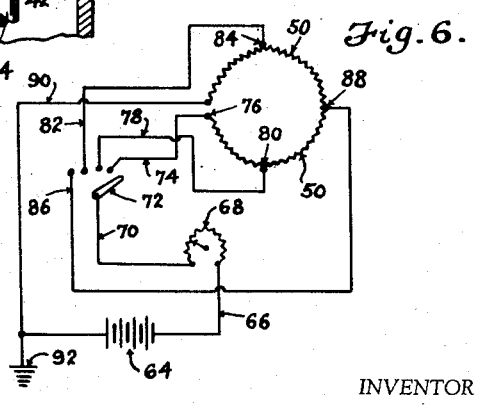
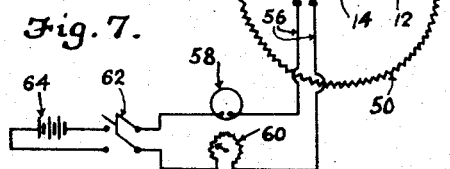
INVENTOR
Louis T. DiLangiano
BY
McMorrow, Berman & Davidson
ATTORNEYS.

UNITED STATES PATENT OFFICE 2,652,476

ELECTRICALLY HEATED STEERING WHEEL

Louis Thomas Di Langiano, Bronx, N. Y.

Application March 18, 1952, Serial No. 277,258

2 Claims. (Cl. 219—19)

This invention relates to the construction of an automotive vehicle steering wheel. More particularly, the invention has reference to an improved arrangement whereby said steering wheel may be warmed electrically.

The desirability of providing a heating means for a vehicle steering wheel is well appreciated by the operators of automotive vehicles, and need not be dwelled upon at length herein. It will suffice to state, it is believed, that during the winter months, a steering wheel will often become so cold to the touch as to result in substantial discomfort so far as the driver of the vehicle is concerned.

Heretofore, it has been proposed to heat an automotive vehicle steering wheel electrically, but to my knowledge, none of the devices previously conceived has met with widespread success, and I believe that this may be due to the fact that the constructions previously devised have not lent themselves readily to incorporation in a conventionally formed vehicle steering wheel.

Steering wheels of modern construction are, in practically all instances, formed with a metallic reinforcing frame including an annular rim and a plurality of spokes, said rim having a plastic coating molded thereabout, which coating in some instances extends about the spokes. In this way, a solidly formed steering wheel is provided.

The main object of the present invention is to provide means for heating a steering wheel of present day construction, without requiring modification or redesigning of the usual solid formation, or of the metallic reinforcing frame arrangement.

Another important object is to provide an electrically heated steering wheel of the type stated, which will be no different, so far as the exterior appearance thereof is concerned, from conventionally molded steering wheels in widespread use today.

Still another important object is to provide an electrically heated steering wheel wherein resistance elements will be so disposed relative to the metallic reinforcing frame, and the plastic coating molded about said frame, as to be electrically insulated by the coating, in an arrangement wherein said elements are wholly spaced from and are insulated from said frame.

Yet another important object is to provide an electrically heated steering wheel wherein the electrical means employed for heating the rim of said wheel will not interfere in any respect with, or require modification of, the conventional horn button arrangement.

Still another object of importance is to provide an electrically heated steering wheel as described which can be manufactured at relatively little increase in cost above steering wheels not having the heat-providing feature.

Other objects will appear from the following description, the claims appended thereto, and from the annexed drawing, in which like reference characters designate like parts throughout the several views, and wherein:

Figure 1 is a top plan view of an automotive vehicle steering wheel formed in accordance with the present invention;

Figure 2 is an enlarged sectional view taken substantially on line 2—2 of Figure 1;

Figure 3 is a sectional view taken substantially on line 3—3 of Figure 2;

Figure 4 is a sectional view taken substantially on line 4—4 of Figure 2;

Figure 5 is a fragmentary perspective view, the scale being enlarged still further, of the steering wheel rim, portions being broken away to show the details of inner construction;

Figure 6 is a diagram of one form of electrical circuit embodied in the invention; and Figure 7 is an electrical diagram illustrating another circuit which can be employed in place of that illustrated in Figure 6.

Referring to the drawings in detail, the reference numeral 10 has been applied to a conventionally formed, hollow, steering column housing, and mounted upon the upper end of said housing is a disc 12 of electrically insulative material, said disc having a center opening 14 and being secured, at locations spaced peripherally thereof, to the end of the housing 10 by means of screws 16 or their equivalents.

Embedded in or otherwise mounted upon the upper surface of the disc 12 is a pair of spaced, annular, contact bars 18, 20, said bars being arranged concentrically with the disc (Figure 4).

The vehicle steering wheel includes a metallic reinforcing frame, said frame having a hollow hub at its center designated by the reference numeral 22, said hub lapping and being rotatably mounted upon the adjacent end of the steering column housing 10. Within the hub, I fixedly mount a second disc 24 of insulating material, the disc 24 being disposed in closely spaced relation to the first disc 12, as best shown in Figure 2. A circumferential series of radially arranged screws 26 extend through the hub into the periphery of the disc 24, to fixedly secure said disc 24 to and within the hub. The disc 24 is formed with a center opening 28 registering with the opening 14 of the first disc.

Mounted in the disc 24 is a pair of outer terminal contacts 30, said contacts being embedded in the disc and having lugs projecting downwardly from the under side of the disc in slidable contact with the outer contact bar 18.

The hub 22 is integrally formed with an interior partition 32 spaced above the disc 24, said partition having a center opening complementary to and receiving the splined end of the steering column 34 of the vehicle. Thus, the steering column is secured to the metallic reinforcing frame for rotation therewith, this being a conventional arrangement in steering wheel construction.

The provision of the partition 32 defines, immediately thereabove, a cup 36 in which is positioned a spring 38 abutting at one end against the partition 32, and exerting upward pressure, at its other end, against the horn button 40. The horn button 40 is, per se, of conventional design and construction, and is provided with the usual lead 42 in circuit with a suitable horn signal, that is sounded on depression of the horn button.

Rigid with and projecting radially and outwardly from the hub 22 are spokes 44, said spokes being of metallic formation and being rigid, at their outer ends, with a metallic rim member 46.

Conventionally, the reinforcing frame defined by the hub 22, spokes 44, and rim member 46 are adapted to provide a core for the steering wheel, a plastic coating being molded about said core to form the completed steering wheel assembly, said assembly being of solid formation so far as the rim and spokes thereof are concerned.

In accordance with the present invention, there is first applied to the metallic reinforcing frame an inner coat 48, said coat being of plastic material and being molded about the rim member and spokes.

After hardening of the inner coat 48, resistance elements 50 are coiled about the rim member, in a spiral arrangement shown particularly to advantage in Figures 1 and 5.

It will be understood, in this connection, that the inner coat need not be molded plastic, but can be any coat of insulating material found sufficient to space the resistance elements 50 away from the metallic reinforcing frame. Thus, the metallic frame can be coated with shellac or the like, and the coating can be applied by dipping of the metallic frame, painting thereof, etc.

In any event, the resistance elements, after being wound spirally upon the rim member of the reinforcing frame, have their ends extended along one of the spokes, it being preferred that the ends of the elements extend underneath the spokes to the hub, which is formed with an aperture 51 through which the ends of the resistance elements extend.

After the resistance elements have been applied to the coated reinforcing frame in the manner described above, an outer coat 52 is applied to said frame, the outer coat being molded onto the rim member and spokes in a conventional manner well known to those skilled in the art.

Embedded in the disc 24 is a second pair of terminals 54, said terminals 54 being formed identically to the outer pair 30. The resistance elements 50 are connected at one end to the terminals 30 and at their other ends to the terminals 54.

It will be understood that if a single resistance element is used, only one terminal 30 and one terminal 54 will be required, said element being connected at its opposite ends thereto.

Connected electrically to the contact bars 18, 20 are leads 56. Referring to Figure 7, one lead 56 extends through an ammeter 58, and through a switch 62 to a source of electric power such as an automobile battery 64. The other lead 56 extends through a rheostat 60, and then through said switch to the source of electrical power.

By reason of this arrangement, a manually operated on-and-off switch 62 is incorporated in the invention, so that the user of the vehicle can shut the warming device off completely. Additionally, the construction is such as to permit the user, when the switch is closed, to adjust the temperature of the steering wheel rim, by operation of the rheostat 60.

It will be noted that contact is made between the contact bars 18, 20 and the terminals 30, 54, in any position to which the steering wheel is rotated on the steering column housing, and it is further believed to be of importance that the entire arrangement operates without the necessity of modification or redesigning of the conventional steering wheel, except, perhaps, to a very minor extent. The steering wheel still is provided with a conventionally formed metalilc reinforcing frame, and is still of solid construction so far as the rim and spokes thereof are concerned, with the outer plastic coat being molded to the metallic frame by use of the same dies and molds as have heretofore been required.

Referring to Figure 6, an alternative circuit has been illustrated, wherein a lead 66 extends from a battery 64, through a rheostat 68. A lead 70 extends from the rheostat to one side of a four-way switch 72. The switch 72 can, if desired, be opened completely, this being the position of the switch illustrated in Figure 6. Alternatively, the switch handle can be shifted so as to close the circuit from the lead 70 to a lead 74, said lead 74 extending to the resistance element 50 and being connected thereto, as at 76, at one point on the circumference of said element.

In another position of the switch, the current flows through a lead 78 to the resistance element 50, the lead 78 being connected to the element 50 as at 80, at a location spaced 90° from the connection 76.

Still further, a circuit can be closed from the lead 70 through a lead 82, connected to the resistance element as at 84. Or, if desired, a circuit can be closed through lead 86 to the element 50, the lead 86 being connected at 88 to said element 50.

The current, after flowing through the resistance element 50, flows out through ground lead 90, extending to a ground 92.

The circuit illustrated in Figure 6 permits selected portions of the resistance elements to be heated, and any portion heated can be controlled as to the temperature thereof by operation of the rheostat 68.

It will be apparent that desirably, a suitable fuse, not shown, would be included in each of the circuits illustrated.

It is believed apparent that the invention is not necessarily confined to the specific use or uses thereof described above, since it may be utilized for any purpose to which it may be suited. Nor is the invention to be necessarily limited to the specific construction illustrated and described, since such construction is only in-

What is claimed is:

1. Means for supplying electrical current to a steering wheel having a circumferential resistance element and a hub enclosing the upper end of and rotatable upon an associated steering column housing, comprising: a pair of coplanar, annular contact bars arranged in spaced, concentric relation; a stationary, flat support disc for said bars mountable on said housing and proportioned for enclosure within the hub; a rotating disc lying in a plane paralleling that of the first disc and enclosed within said hub for rotation therewith; and contact terminals spaced radially of said rotating disc and extending into slidable contact with the respective contact bars, said terminals being electrically connected to opposite ends of said element and said bars being adapted for electrical connection in circuit with a source of electricity.

2. Means for supplying electrical current to a steering wheel having a circumferential resistance element and a hub enclosing the upper end of and rotatable upon an associated steering column housing, comprising: a pair of coplanar, annular contact bars arranged in spaced, concentric relation; a flat support disc of electrically insulative material having means at its periphery for fixedly mounting the same upon the upper end of a steering column housing, said disc extending transversely of the housing in a plane normal thereto, said bars being mounted on and facing upwardly from said disc within the hub; a rotary disc of electrically insulative material having means at its periphery to secure the same to the hub, said rotary disc lying in a plane spaced closely above and paralleling that of the first disc; and contact terminals depending from and spaced radially of the second disc in slidable contact with the respective contact bars, said terminals being electrically connected to opposite ends of said element and said bars being adapted for electrical connection in circuit with a source of electricity.

LOUIS THOMAS DI LANGIANO.

References Cited in the file of this patent

UNITED STATES PATENTS

| Number | Name | Date |
|---|---|---|
| 878,708 | Berg | Feb. 11, 1908 |
| 1,062,745 | Smith | May 27, 1913 |
| 1,871,780 | Crawford | Aug. 16, 1932 |
| 2,018,947 | Claridge | Oct. 29, 1935 |
| 2,147,599 | Becker | Feb. 14, 1939 |
| 2,392,539 | Leible | Jan. 8, 1946 |